A. PERLICH.
POT FOR MAKING COFFEE AND LIKE BEVERAGES.
APPLICATION FILED AUG. 29, 1907.
913,303.
Patented Feb. 23, 1909.
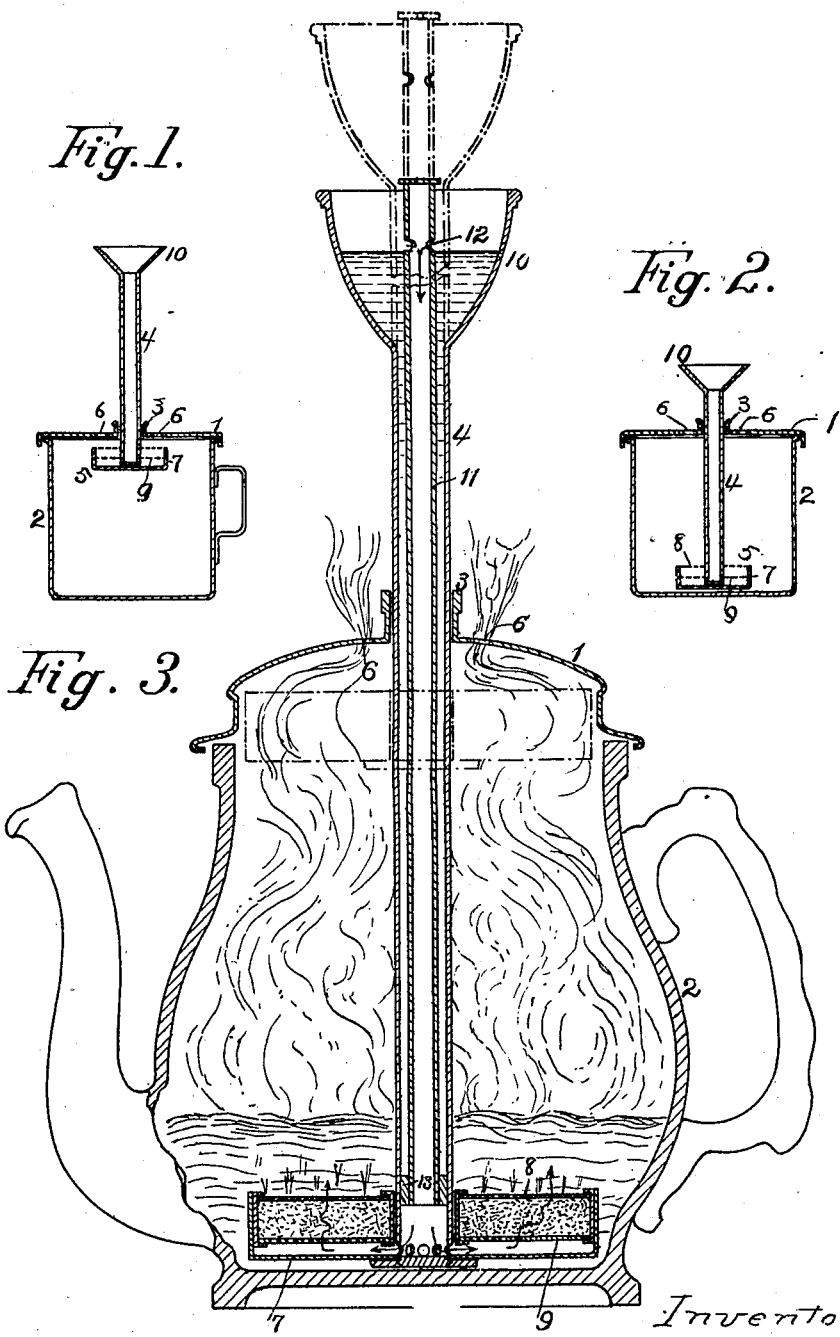

UNITED STATES PATENT OFFICE.

ALBIN PERLICH, OF DRESDEN, GERMANY.

POT FOR MAKING COFFEE AND LIKE BEVERAGES.

No. 913,303.　　　　Specification of Letters Patent.　　　　Patented Feb. 23, 1909.

Application filed August 29, 1907. Serial No. 390,622.

*To all whom it may concern:*

Be it known that I, ALBIN PERLICH, a subject of the German Emperor, and residing at Dresden, Germany, have invented certain new and useful Improvements in Pots for Making Coffee and the Like Beverages, of which the following is a specification.

The present invention has reference to pots for making coffee and like beverages, and relates more especially to improvements in that type of vessels in which the infusion material, such as ground coffee, tea leaves and the like is subjected to the action of slowly percolating boiling water, and the object of the invention is to provide means whereby coffee or the like is first steamed within the upper part of the vessel, and afterwards lowered to the bottom of the pot and there subjected to the filtering action of the boiling water.

The object of this vapor bath is to preheat and moisten the material and thus make it more susceptible to the ensuing filtering action of the boiling water, yielding a richer extract and in a less time than when no prior steaming is resorted to.

In order to make my invention more readily understood, I will now describe it more particularly with reference to the drawings, in which—

Figure 1 is a diagrammatic view showing a vertical section through a simple form of the apparatus, with the strainer in the position for steaming. Fig. 2 is a similar view with the strainer in the position for filtering; Fig. 3 is a vertical section through a modified form of the construction, the dotted lines showing the strainer in the position for steaming.

I will, hereinafter, refer to the material to be treated, simply as coffee, though it is obvious that any other material, such as tea or the so-called " postum," and the like may be similarly treated.

The cover, 1, of the pot, 2, is provided with a neck portion, 3, serving as stuffing box for the pipe or hollow stem, 4, of the slidable strainer proper, 5. Around the neck are grouped perforations, 6. The strainer proper, 5, consists of a box, 7, with a removable perforated cover plate, 8, and a likewise perforated false bottom, 9, somewhat above the solid bottom. The hollow stem, 4, extends below the false bottom and communicates with the space between the two bottoms, it being provided at its upper end with a funnel-shaped mouth, 10.

In operation the ground coffee is placed in the strainer upon the perforated bottom, the cover plate is put in place and the cover, 1, is placed on the pot, which has previously been partially filled with boiling water. The strainer is held in the position shown in Fig. 1, and the vapors arising on their way to the outlets, 6, in the cover, are forced to pass over and contact with the upper surface of the coffee, saturating and softening it. After a few minutes of steaming, the strainer is lowered into the pot, as shown in Fig. 2. Boiling water is now slowly poured into the funnel, 10, down the pipe or hollow stem, and is thus forced under pressure through the coffee, finally entering the liquid through the cover plate, 8, in thoroughly infused state.

In the modification shown in Fig. 3, there is shown a second pipe stem, 11, within the funneled stem, 4, provided above with overflow openings, 12, and below with means as a suitable packing ring, 13, for making it fluid-tight within the stem, 4. This arrangement serves the purpose of providing a hot water jacket for the pipe 11. When pouring the boiling water into the funnel, it will first fill the space between the pipes, will then rise in the funnel and finally overflow through the apertures 12 into the pipe, 11, and thence pass through openings, 12, into the strainer underneath the perforated bottom, 9. From thence the pre-heated water will pass upward through the filter into the body of the pot.

What I claim as new is:—

1. A pot of the character described, provided with a body proper, a perforated cover, a strainer comprising a receptacle having a solid bottom, a perforated top plate, and a perforated false bottom therein, a pipe or hollow stem communicating below with the space between said false bottom and the solid bottom, a second pipe within the first-named pipe or hollow stem having overflow openings below the upper edge thereof, and means on the inner tube for tightly packing at its lower end the space between the pipes, substantially as and for the purpose set forth.

2. A pot of the character described, provided with a body proper, vapor escapes, a cover, a strainer comprising a receptacle having a solid bottom, a perforated top plate and a perforated false bottom therein, a pipe or hollow stem slidable in the cover having a funnel shaped upper end carrying the strainer and communicating below with the space between said false bottom and the solid bottom, and a smaller pipe packed tightly at its lower end within the slidable pipe and communicating near the top with said pipe and extending above the same, substantially as and for the purpose set forth.

In testimony whereof I affix my signature in presence of two witnesses.

ALBIN PERLICH.

Witnesses:
PAUL ARRAS,
CLÁRE SIMON.